(12) United States Patent
Bopp et al.

(10) Patent No.: US 8,449,009 B1
(45) Date of Patent: May 28, 2013

(54) ADAPTER FOR ATTACHMENT OF A DISPLAY UNIT TO A CONSOLE OF A VEHICLE

(75) Inventors: Jayson K. Bopp, Fishers, IN (US); James A. Negro, Nineveh, IN (US)

(73) Assignee: Raytheon Company, Waltham, MA (US)

( * ) Notice: Subject to any disclaimer, the term of this patent is extended or adjusted under 35 U.S.C. 154(b) by 1773 days.

(21) Appl. No.: 11/567,536

(22) Filed: Dec. 6, 2006

(51) Int. Cl.
 *B60R 13/00* (2006.01)
(52) U.S. Cl.
 USPC .................. 296/24.34; 248/27.1; 348/837
(58) Field of Classification Search
 USPC ............ 296/24.34, 37.8, 70; 248/27.1, 354.1; 348/837
 See application file for complete search history.

(56) References Cited

U.S. PATENT DOCUMENTS

| | | | | |
|---|---|---|---|---|
| 1,735,904 A * | 11/1929 | Keeney | ............ | 180/90 |
| 2,473,051 A * | 6/1949 | Carlson | ............ | 248/27.1 |
| 3,710,476 A * | 1/1973 | Hollingsead et al. | ............ | 403/14 |
| 3,827,772 A * | 8/1974 | Johnson | ............ | 312/7.1 |
| 4,790,501 A * | 12/1988 | Waters | ............ | 248/27.1 |
| 4,913,383 A * | 4/1990 | Hill et al. | ............ | 248/27.1 |
| 4,920,799 A * | 5/1990 | Low | ............ | 73/431 |
| 5,129,594 A * | 7/1992 | Pease | ............ | 244/1 R |
| 5,190,241 A * | 3/1993 | Pease | ............ | 244/1 R |
| 5,259,655 A * | 11/1993 | Anderson | ............ | 296/70 |
| 5,302,139 A * | 4/1994 | Starsja | ............ | 439/544 |
| 5,423,499 A * | 6/1995 | Webb | ............ | 248/27.1 |
| 5,785,391 A * | 7/1998 | Parry et al. | ............ | 301/111.04 |
| 6,666,413 B2 * | 12/2003 | Nakajima | ............ | 248/27.1 |
| 6,779,826 B2 * | 8/2004 | Nakajima | ............ | 296/70 |
| 7,044,538 B2 * | 5/2006 | Stack | ............ | 296/208 |
| 7,163,249 B2 * | 1/2007 | Schmidt et al. | ............ | 296/37.12 |
| 7,168,751 B2 * | 1/2007 | Schmidt et al. | ............ | 296/70 |
| 7,370,719 B2 * | 5/2008 | Sakamoto | ............ | 180/90 |
| 7,401,835 B2 * | 7/2008 | Gresham et al. | ............ | 296/70 |
| 7,401,954 B2 * | 7/2008 | Callahan et al. | ............ | 362/489 |
| 7,543,871 B2 * | 6/2009 | Quigley et al. | ............ | 296/24.34 |
| 2003/0141738 A1 * | 7/2003 | Straesser, Jr. | ............ | 296/70 |
| 2006/0061125 A1 * | 3/2006 | Schmidt et al. | ............ | 296/70 |
| 2006/0249632 A1 * | 11/2006 | McKelvey | ............ | 248/27.1 |
| 2007/0068717 A1 * | 3/2007 | Austin et al. | ............ | 180/90 |
| 2007/0262854 A1 * | 11/2007 | Colburn et al. | ............ | 340/438 |

\* cited by examiner

*Primary Examiner* — Jason S Morrow
(74) *Attorney, Agent, or Firm* — Renner, Otto, Boiselle & Sklar, LLP

(57) ABSTRACT

A device includes an adapter having a number of holes and a number of threaded studs. The holes are arranged in a spaced apart pattern corresponding to a bolt pattern of a legacy cockpit display unit. The threaded studs are arranged in a spaced apart pattern similar to a bolt pattern of a display unit.

11 Claims, 3 Drawing Sheets

ADAPTER FOR ATTACHMENT OF A DISPLAY UNIT TO A CONSOLE OF A VEHICLE

TECHNICAL FIELD

This disclosure generally relates to display units for vehicles, and more particularly, to an adapter for attachment of a display unit to a console of a vehicle and method of implementing the same.

BACKGROUND

The ever increasing complexity of aircraft systems has witnessed a corresponding increase of complexity of flight instrumentation used in the cockpits of these aircraft systems. A solution to this problem has been to implement one or more video display units in the cockpit such that various flight instruments may be alternatively represented by images on the video display unit. Using these video display units, the number of individual flight instruments in the cockpit of the aircraft has been reduced. A video display unit that has been implemented in a cockpit of an aircraft is commonly referred to as a glass cockpit.

SUMMARY

In one embodiment, a device includes an adapter having a number of holes and a number of threaded studs. The holes are arranged in a spaced apart pattern corresponding to a bolt pattern of a legacy cockpit display unit. The threaded studs are arranged in a spaced apart pattern similar to a bolt pattern of a display unit.

In another embodiment, a method includes providing an adapter having a number of holes and a number of threaded studs, aligning the holes with a first bolt pattern of a receptacle in the console, mounting the adapter to a console of a vehicle, aligning holes in the display unit with the threaded studs, and mounting the display unit. The adapter may be secured to the receptacle and display unit using fasteners such as bolts or screws.

Some embodiments of the present disclosure may provide numerous technical advantages. A technical advantage of one embodiment may be to provide a glass display unit for a vehicle such as an aircraft that is generally less expensive than previously known implementations. One previous approach has been to redesign the cockpit in order to accept display units. This approach may nevertheless incur significant costs due to stringent prove-in requirements of the new cockpit design. Certain embodiments may thus provide advantage over this as well as other approaches in that a generally inexpensive adapter may be implemented to allow retrofitting a display unit to a console of a vehicle with relatively lower costs than other implementations.

Although specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Legacy cockpit display units for aircraft cockpits have been implemented with a generally square-shaped aspect ratio. The aspect ratio is generally referred to as the ratio of the width to the height of the display portion of a display unit. The square-shaped aspect ratio has been conventionally adopted by the aircraft industry for several reasons. For example, these display units have been implemented to replace one or more flight instruments such as generally round-shaped dials or indicators on the console of the aircraft. The legacy cockpit display unit would be configured to display a representation of the instrument on the display and could be easily configured to alternatively display a representation of another instrument at the desire of the user or pilot. Thus, the legacy cockpit display unit has served to replace many of the plethora of flight instrumentation in the aircraft cockpit.

The display unit having a display with a square-shaped aspect ratio would most easily accommodate a round-shaped instrument. The aircraft industry has generally adopted this generally square-shaped aspect ratio for displays of legacy cockpit display units. Aeronautical Radio, Incorporated (ARINC) is an organization that has established various guidelines and standards to be used with various types of components that may be implemented on aircraft systems. Of these guidelines, Aeronautical Radio, Incorporated has established guidelines regarding the dimensional aspects of display units. Thus, industrial convention as well as the type of images displayed on the display unit has led the aircraft industry to adopt display units having generally square-shaped aspect ratios.

Other industries, such as the general consumer industry, have adopted industry standards for display units that differ from the aircraft industry. For example, display units having aspect ratios of 4:3 or 16:9 have been developed in order to conform to various consumer devices, such as conventional television equipment. The relatively large market provided by these non-square aspect ratio designs has enabled use of display units that are comparable in quality and less expensive to produce than legacy cockpit display units having a generally square-shaped aspect ratio. Thus, the teachings of the present disclosure recognize that it would be beneficial to provide a display unit that may be retrofitted to a vehicle cockpit having a receptacle that is adapted to accept a legacy cockpit display unit.

Figure 1:
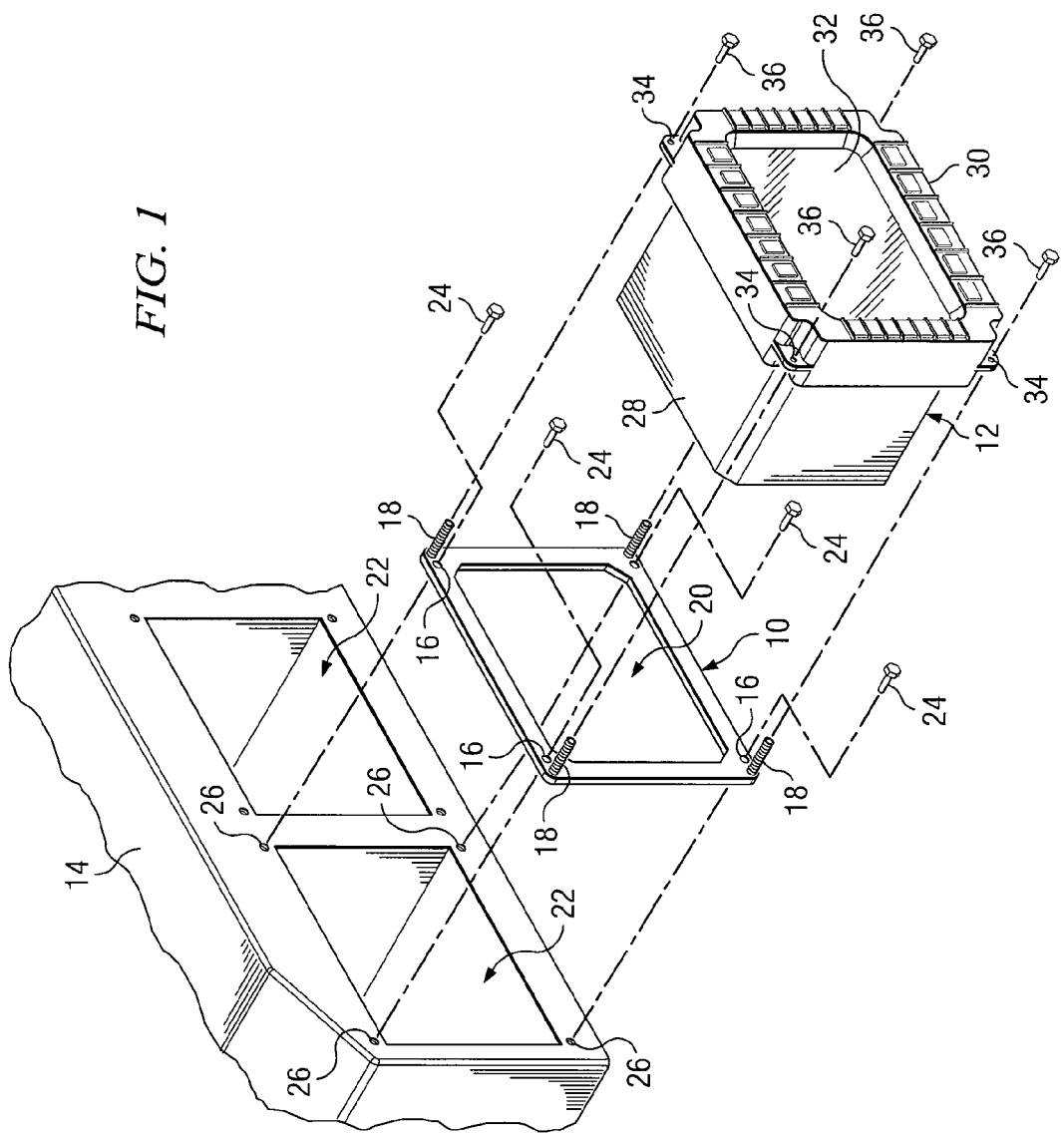
FIG. 1 is a perspective exploded view of one embodiment of an adapter that may be used for attachment of a display unit to a console of a vehicle.

FIG. 1 illustrates one embodiment of an adapter 10 that may be implemented to provide attachment of a display unit 12 to a console 14 of a vehicle. Adapter 10 generally includes a number of holes 16 and a number of threaded studs 18. The holes 16 provide for attachment of the adapter 10 to a console 14 of a vehicle, and the threaded studs 18 provide for attachment of the adapter 10 to a display unit, which may be an industry standard display unit 12 in one embodiment. As described in greater detail below, the adapter 10 may provide for reciprocal attachment of display unit 12 to console 14 of a vehicle by disposing the adapter in between the console 14 and the display unit 12. Thus, certain embodiments may provide an advantage in that a commercially available display unit 12 may be provided for attachment to a console 14 that is adapted for use with legacy cockpit display units.

Adapter 10 may have any shape that maintains holes 16 in a fixed spaced apart relation to threaded studs 18. In this manner, display unit 12 may be rigidly secured in console 14. In one embodiment, the adapter 10 may made of any generally rigid material, such as metal or thermoplastic having a generally flat shape. In one embodiment, the adapter 10 may be formed from one piece. In this particular embodiment, adapter may have an aperture 20 sufficient in size to allow insertion of a display unit 12. In another embodiment, adapter 10 may be formed in two pieces in which each piece is has two holes 16 and two threaded studs 18. In yet another embodiment, adapter 10 may be formed in four pieces in which each piece has one hole 16 and one threaded stud 18.

Console 14 may have one or more receptacles 22 for attachment of one or more corresponding legacy cockpit display units (not specifically shown). Each receptacle 22 may include a number of threaded holes 26. Threaded holes 26 are spaced apart over the console 14 in a particular spaced apart pattern that is similar to a bolt pattern of a conventional legacy cockpit display. In one embodiment, the bolt pattern may be four threaded holes 26 that are arranged in a rectangular fashion relative to one another. In another embodiment, the bolt pattern of the threaded holes 26 may be specified according to dimensions established by Aeronautical Radio, Incorporated (ARINC). Holes 16 in adapter 10 may be disposed in any spaced apart pattern that provides for attachment to receptacle 22. In one embodiment, holes 16 may be arranged in a spaced apart pattern that is similar to bolt pattern of threaded holes 26. In this manner, the adapter 10 may be attached to receptacle 22 using fasteners 24 such as screws that extend through holes 16 and are secured in threaded holes 26.

Display unit 12 has a generally box-shaped electrical circuit enclosure portion 28 and a display head portion 30. Display head portion 30 has a generally non-square shaped display glass 32. In one embodiment, display glass 32 may have any aspect ratio that is generally non-square is shape, such as a display glass having a 4:3 or 16:9 aspect ratio. Display head portion 30 has a number of display head holes 34 arranged in a particular bolt pattern. In this particular embodiment, the bolt pattern incorporates a quantity of four display head holes 34 that are implemented on either corner of the display head portion 30 and are arranged in a rectangular fashion.

Although the previously described display unit 12 is described with a particular bolt pattern, it should be appreciated that other embodiments of display units 12 may have other bolt patterns. Threaded studs 18 may be disposed in adapter 10 in any spaced apart pattern that provides for attachment of display unit 12 to adapter 10. In one embodiment, threaded studs 18 may be arranged in a spaced apart pattern that is similar to bolt pattern of display head holes 34. The display unit 12 may be attached to adapter using fasteners 36, such as screws that extend through display head holes 34 and are secured in threaded studs 18.

Figure 2:
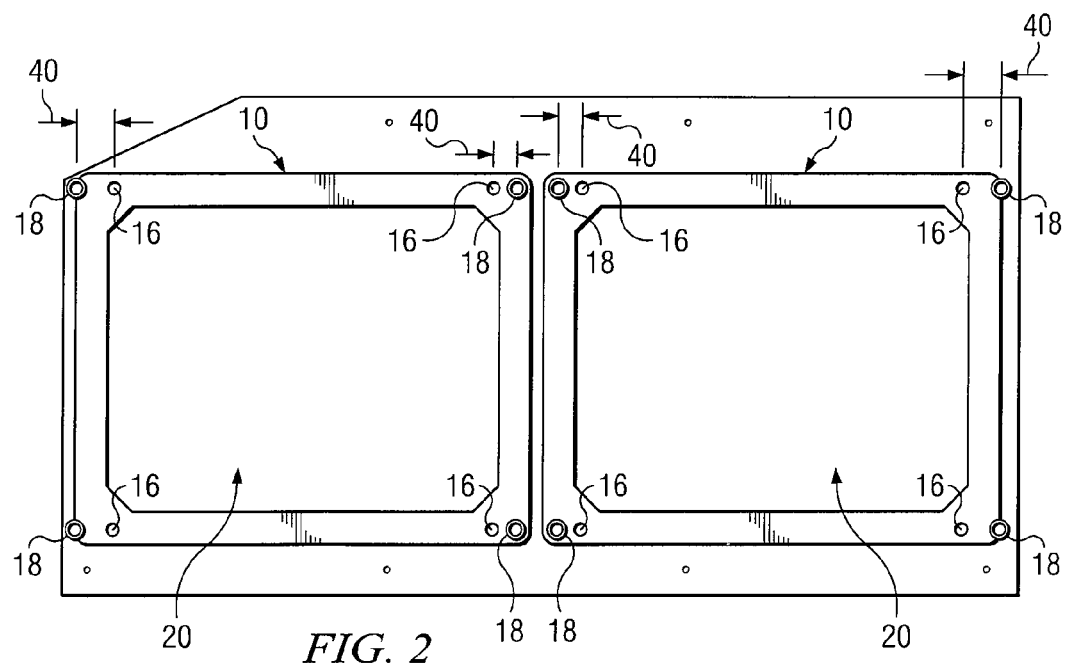
FIG. 2 is a front elevational view of two adapters of the embodiment of FIG. 1 that are positioned in front of two receptacles that are arranged in a side-by-side configuration.

In one embodiment, threaded studs 18 may be disposed in the adapter 10 relative to the holes 16 such that two of the displays 12 may be attached in a console having two receptacles 22. The console 14 may have two receptacles 22 for attachment of two legacy cockpit display units as shown in FIG. 1. However, a suitably sized display unit 12 may have a width that is greater than the width of a legacy cockpit display unit due to its aspect ratio. An enlarged elevational view of two adapters 10 that may be disposed in a side-by-side arrangement are shown in FIG. 2.

In one embodiment, threaded studs 18 may incorporate a lateral offset 40 relative to holes 16 to enable attachment of two display units 12 in this side-by-side arrangement. The lateral offset 40 is shown in FIG. 2 wherein the spaced apart pattern of the threaded studs 18 has been shifted laterally with respect to the spaced apart pattern of holes 16. In this manner, two display units 12 may be attached in a side-by-side configuration in console 14 having two receptacles 22 arranged in a side-by-side configuration.

Figure 3:
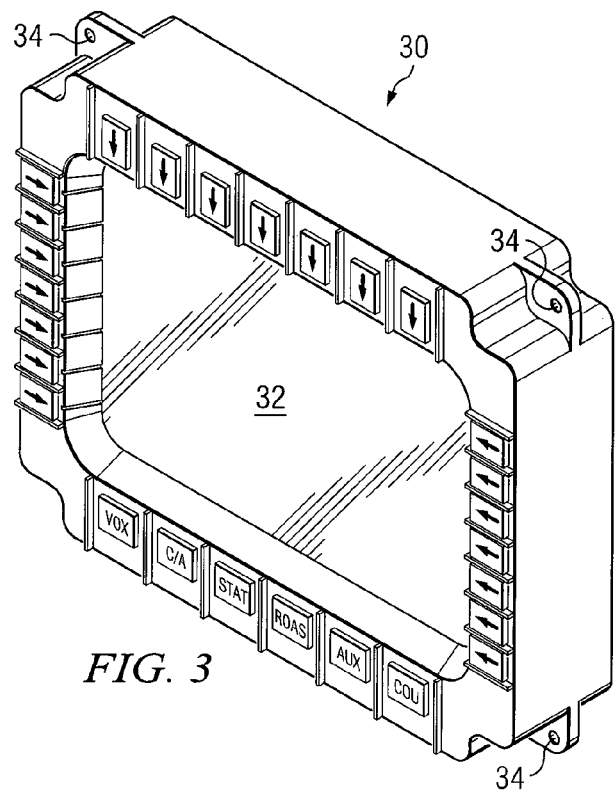
FIG. 3 is a perspective view of a display head portion of one embodiment of a display unit.
Figure 4:
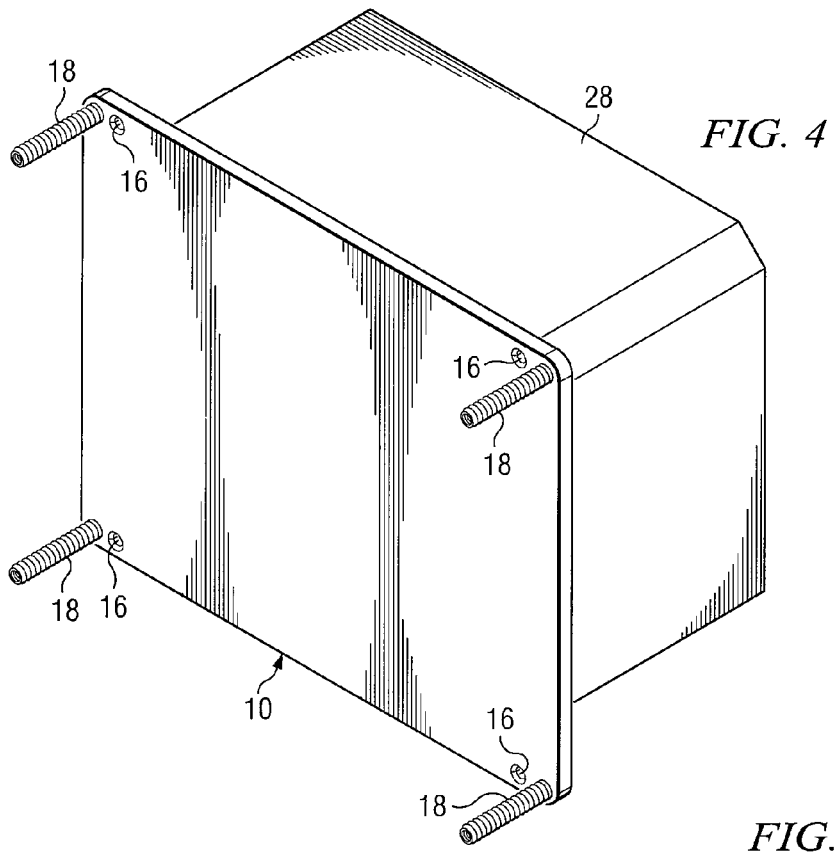
FIG. 4 is a perspective view of a electrical circuit enclosure portion of the display unit of FIG. 3.

In another embodiment, display unit 12 may have a display head portion 30 and an electrical circuit enclosure portion 28 that may be physically separate from one another as shown in FIGS. 3 and 4 respectively. Display head portion 30 and electrical circuit enclosure portion 28 are physically separated so that they may be separately attached to console 14. As shown in FIG. 4, adapter 10 may be integrally attached to the electrical circuit enclosure portion 28. In this particular embodiment, electrical circuit enclosure portion 28 may be attached to console 14 independently of display head portion 30.

Figure 5:
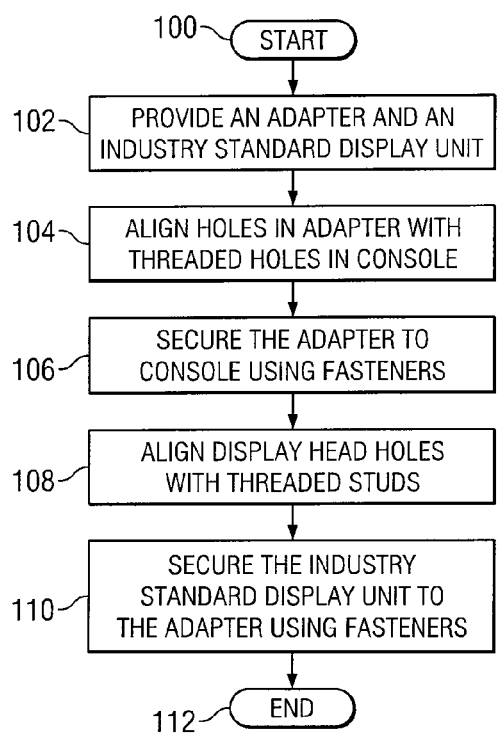
FIG. 5 is a flowchart showing a sequence of actions that may be taken in order to implement the adapter of FIG. 1 or 4 in the console of a vehicle.

FIG. 5 shows a sequence of acts that may be performed in order to attach display unit 12 to receptacle 22. In act 100, the method is initiated. In act 102, an adapter 10 and an in display unit 12 as described above may be provided. Adapter 10 may be integrally attached to electrical circuit enclosure portion 28 as shown in FIG. 4 or may be physically separate from the electrical circuit enclosure portion 28 as shown in FIG. 1. In act 104, holes 16 may be aligned with threaded holes 26 in console 14. The adapter 10 may then be secured to console 14 using fasteners 24 in act 106. In the particular embodiment described above in which the adapter 10 is integrally attached to the electrical circuit enclosure portion 28 as shown in FIG. 4, the electrical circuit enclosure portion 28 may first be inserted in receptacle 22.

In act 108, display head holes 34 may be aligned with threaded studs 18. If the display head portion 30 is physically separate from electrical circuit enclosure portion 28, any cable interconnections of circuitry in electrical circuit enclosure portion 28 to display head portion 30 may be performed at this point in time. If the display head portion 30 is integrally attached to electrical circuit enclosure portion 28 as shown in FIG. 1, electrical circuit enclosure portion 28 may first be inserted through aperture 20. In act 110, the display unit 12 may be mounted to the adapter using fasteners 36. In act 112, display unit 12 has been mounted to console 14 and thus may be used by a user of the vehicle in a normal manner.

An adapter 10 for attachment of a display unit 12 to a console 14 has been described that provides for implementation of commercial off the shelf (COTS) type display units 12 in a console 14 of a vehicle. Although the foregoing description disclosed implementation of the adapter 10 in a vehicle that was an aircraft, it should be appreciated that the teachings of the previously described embodiments may be applied to other types of vehicles, such as aircraft, land-based vehicles, watercraft, as well as military and commercial versions of these vehicle types. Thus, certain embodiments may provide advantage in that technological innovations that may have been applied to display units 12 may also be implemented for use in vehicles.

It will be apparent that many modifications and variations may be made to embodiments of the present disclosure, as set forth above, without departing substantially from the principles of the present disclosure. Therefore, all such modifications and variations are intended to be included herein within the scope of the present disclosure, as defined in the claims that follow.

What is claimed is:

1. A device comprising:
an adapter being generally flat in shape and comprising:
four holes arranged in a first spaced apart pattern corresponding to a first bolt pattern of a vehicle console, the first bolt pattern of the vehicle console configured for mounting a legacy cockpit display unit having a generally square-shaped display glass to the vehicle console; and
four threaded studs arranged in a second spaced apart pattern corresponding to a second bolt pattern of a first display unit having a generally non-square-shaped display glass, the second spaced apart pattern being shifted laterally relative to the first spaced apart pattern;
wherein the first bolt pattern of the vehicle console comprises a plurality of threaded holes, the device further comprising a plurality of fasteners for attaching the adapter to the vehicle console, each fastener extending through one of the holes of the adapter and into a corresponding threaded hole of the vehicle console.

2. A device comprising:
an adapter being generally flat in shape and comprising:
four holes arranged in a first spaced apart pattern corresponding to a first bolt pattern of a vehicle console, the first bolt pattern of the vehicle console configured for mounting a legacy cockpit display unit having a generally square-shaped display glass to the vehicle console; and
four threaded studs arranged in a second spaced apart pattern corresponding to a second bolt pattern of a first display unit having a generally non-square-shaped display glass, the second spaced apart pattern being shifted laterally relative to the first spaced apart pattern;
wherein the first display unit comprises a display head portion and a generally box-shaped electrical circuit enclosure portion, the electrical circuit enclosure portion being integrally attached to the adapter.

3. A device comprising:
an adapter comprising:
a plurality of holes arranged in a first spaced apart pattern corresponding to a first bolt pattern of a vehicle console, the first bolt pattern of the vehicle console configured for mounting a legacy cockpit display unit to the vehicle console; and
a plurality of threaded studs arranged in a second spaced apart pattern corresponding to a second bolt pattern of a first display unit having a generally non-square shaped display glass;
wherein the first bolt pattern of the vehicle console comprises a plurality of threaded holes, the device further comprising a plurality of fasteners for attaching the adapter to the vehicle console, each fastener extending through one of the holes of the adapter and into a corresponding threaded hole of the vehicle console.

4. The device of claim 3, wherein the adapter is generally flat in shape and disposed in between the vehicle console and a display head portion of the first display unit.

5. A device comprising:
an adapter comprising:
a plurality of holes arranged in a first spaced apart pattern corresponding to a first bolt pattern of a vehicle console, the first bolt pattern of the vehicle console configured for mounting a legacy cockpit display unit to the vehicle console; and
a plurality of threaded studs arranged in a second spaced apart pattern corresponding to a second bolt pattern of a first display unit having a generally non-square shaped display glass;
wherein the legacy cockpit display unit has a generally square-shaped display glass.

6. A device comprising:
an adapter comprising:
a plurality of holes arranged in a first spaced apart pattern corresponding to a first bolt pattern of a vehicle console, the first bolt pattern of the vehicle console configured for mounting a legacy cockpit display unit to the vehicle console; and
a plurality of threaded studs arranged in a second spaced apart pattern corresponding to a second bolt pattern of a first display unit having a generally non-square shaped display glass;
wherein the display unit has a generally non-square shaped display glass.

7. A device comprising:
an adapter comprising:
a plurality of holes arranged in a first spaced apart pattern corresponding to a first bolt pattern of a vehicle console, the first bolt pattern of the vehicle console configured for mounting a legacy cockpit display unit to the vehicle console; and
a plurality of threaded studs arranged in a second spaced apart pattern corresponding to a second bolt pattern of a first display unit having a generally non-square shaped display glass;
wherein the first display unit comprises a display head portion and a generally box-shaped electrical circuit enclosure portion, the electrical circuit enclosure portion being integrally attached to the adapter such that the electrical circuit enclosure portion may fit in a cavity formed in the vehicle console of a vehicle.

8. A method comprising:
providing a first adapter comprising:
a plurality of holes arranged in a first spaced apart pattern corresponding to a first bolt pattern of a vehicle console, the first bolt pattern of the vehicle console configured for mounting a first legacy cockpit display unit to the vehicle console; and
a plurality of threaded studs arranged in a second spaced apart pattern corresponding to a bolt pattern of a first display unit having a generally non-square-shape display glass;
aligning the plurality of holes of the first adapter with the first bolt pattern of the vehicle console;
mounting the first adapter to the vehicle console using a first plurality of fasteners;
aligning a plurality of holes of the first display unit with the plurality of threaded studs of the first adapter; and
mounting the first display unit to the adapter using a second plurality of fasteners;
wherein the vehicle console comprises a console of an aircraft.

9. A method comprising:
providing a first adapter comprising:
a plurality of holes arranged in a first spaced apart pattern corresponding to a first bolt pattern of a vehicle console, the first bolt pattern of the vehicle console configured for mounting a first legacy cockpit display unit to the vehicle console; and a plurality of threaded studs arranged in a second spaced apart pattern corresponding to a bolt pattern of a first display unit having a generally non-square-shape display glass;

aligning the plurality of holes of the first adapter with the first bolt pattern of the vehicle console;

mounting the first adapter to the vehicle console using a first plurality of fasteners;

aligning a plurality of holes of the first display unit with the plurality of threaded studs of the first adapter; and mounting the first display unit to the adapter using a second plurality of fasteners;

wherein providing a first adapter further comprises providing a first adapter that is integrally attached to an electrical circuit enclosure portion of the first display unit, the electrical circuit enclosure porting being physically separate from a display head portion of the first display unit.

10. The method of claim 9, further comprising prior to aligning the plurality of holes of the first adapter with the first bolt pattern of the vehicle console, inserting the electrical circuit enclosure portion in a receptacle in the vehicle console.

11. The method of claim 10, wherein aligning a plurality of holes of the first display unit with the plurality of threaded studs of the first adapter further comprises aligning a plurality of holes of the display head portion with the plurality of threaded studs of the first adapter.

* * * * *